(12) United States Patent
Kitamura et al.

(10) Patent No.: US 6,375,283 B1
(45) Date of Patent: Apr. 23, 2002

(54) RADIO DEVICE HOUSING

(75) Inventors: Toshiyasu Kitamura; Akinori Ohira, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/432,538

(22) Filed: Nov. 3, 1999

(30) Foreign Application Priority Data

Nov. 10, 1998 (JP) .......................................... 10-319360

(51) Int. Cl.[7] ................................................. A47B 5/00
(52) U.S. Cl. ....................... 312/7.1; 312/223.1; 292/81; 292/87
(58) Field of Search ............................... 312/7.1, 223.1, 312/223.2, 264, 111; 292/80, 81, 83, 87

(56) References Cited

U.S. PATENT DOCUMENTS

| 4,081,751 A | * | 3/1978 | Maddaloni | ............... 312/7.1 X |
|---|---|---|---|---|
| 4,199,204 A | * | 4/1980 | Hodsdon et al. | ............. 312/7.1 |
| 4,759,466 A | * | 7/1988 | Chase et al. | ......... 312/223.2 X |
| 5,100,015 A | * | 3/1992 | Vanderstuyf | .............. 292/87 X |
| 5,269,598 A | * | 12/1993 | Liu | .......................... 312/223.2 |
| 5,575,545 A | * | 11/1996 | Wang | .................. 312/223.2 X |
| 5,931,514 A | * | 8/1999 | Chung | ...................... 292/87 X |

* cited by examiner

Primary Examiner—Jose V. Chen
Assistant Examiner—Hanh V. Tran
(74) Attorney, Agent, or Firm—Pearne & Gordon LLP

(57) ABSTRACT

There is provided a radio device housing, without the risk of causing deterioration of the mechanical strength and the rigidity of the housing with respect to bend or twist deriving from a small size and a thin shape of the radio device main body. First ribs are provided in either an upper case or a lower case on the entire periphery along the joint surface of the upper case and the lower case. A plurality of fitting nails are provided in either the upper case or the lower case for holding and fixing with each other. Second ribs are provided in the rifts in the case not having the first ribs. Third ribs are provided on the fitting nails and the second ribs for contacting the upper case and the lower case when they are fitted with each other so that they are not displaced in the thrust direction with each other.

8 Claims, 12 Drawing Sheets

PRIOR ART

PRIOR ART

PRIOR ART

RADIO DEVICE HOUSING

BACKGROUND OF THE INVENTION

The present invention relates to a housing for a radio device, in particular, for a portable phone and a PHS. More specifically, it relates to that without the risk of deteriorating the mechanical strength and the rigidity of the housing with respect to bending or twisting in light of the trend toward realizing a smaller size and thinner shape in a radio device main body.

Recently, manufacturers of radio devices, in particular, portable phones and PHS are actively striving for the new product development for achieving a smaller size, a light weight and a thinner shape of the radio device main body. According to the trend, the mechanical strength of the housing for accommodating the radio device main body tends to be vulnerable due to a thinner shape of the housing and deterioration of the rigidity of the housing.

The configuration of a conventional radio device housing, such as a portable phone and a PHS will be explained hereinafter. FIGS. 11 to 16 show the structure of a conventional radio device housing. FIG. 11 is a perspective view, FIG. 12 is a right side view, FIG. 13 is a plan view of an upper case 10, FIG. 14 is a diagram showing the projection size B1 of a first rib in a housing, FIG. 15 is a plan view of a lower case 20, and FIG. 16 is a diagram showing the projection size of a fitting part 23 in the housing, respectively.

In FIG. 11, the radio device housing mainly comprises the upper case 10 and the lower case 20. The upper case 10 is provided with first ribs 11 on the entire periphery along the joint surface with respect to the lower case 20, and fitting nails 13 to be fitted with fitting parts 23 of the lower case 20.

On the other hand, the lower case 20 is provided with second ribs 21 in the rifts of the first ribs 11. Furthermore, fitting parts 23 to be fitted with the fitting nails 13 of the upper case 10.

Operation of the radio device housing with the configuration as mentioned above will be explained. After placing a functional block or a mechanism part of the radio device main body on the upper case 10 and the lower case 20, the upper case 10 and the lower case 20 are fitted with each other.

Of course, the fitting operation is executed with positioning at positioning points provided in each part. As a result of fitting the upper and lower cases, the upper case 10 and the lower case 20 will serve as a housing, with the radio device main body accommodated therein.

Various kinds of forces will be applied from the outside while using radio devices. Therefore, insufficient mechanical strength of a radio device housing would result in damage or breakage.

Although the conventional radio device housing is durable in a mode without bend or twist in terms of the mechanical strength owing to the function of the first and second ribs, a problem is involved in that the mechanical strength if insufficient and damage or breakage is liable to be generated in a mode with bend or twist.

SUMMARY OF THE INVENTION

The invention is for solving the conventional problem, and an object thereof is to provide a radio device housing with a small size and the excellent characteristic, capable of solving the problem of deterioration of the mechanical strength and the rigidity of the housing accommodating a main body with respect to bend or twist deriving from a small size and a thin shape of the radio device main body.

In order to solve the problem, a radio device housing according to the invention comprises first ribs provided in either the upper case or the lower case, on the entire periphery along the joint surface of the upper case and the lower case, a plurality of fitting nails provided in either the upper case or the lower case, a plurality of fitting parts provided in the case not having the first ribs, second ribs provided among the plurality of the fitting parts provided in the case not having the first ribs, and third ribs provided on the fitting nails and the second ribs, in an upper case and a lower case of a radio device main body.

According to the configuration, a radio device housing with a small size and the excellent characteristic, capable of solving the problem of deterioration of the mechanical strength and the rigidity of a housing accommodating a main body with respect to bend or twist deriving from a small size and a thin shape of the radio device main body can be provided.

DETAILED DESCRIPTION OF THE PREFERRED EMBODIMENTS

Hereinafter, an embodiment of the invention will be explained with reference to the accompanied drawings.

Figure 1:
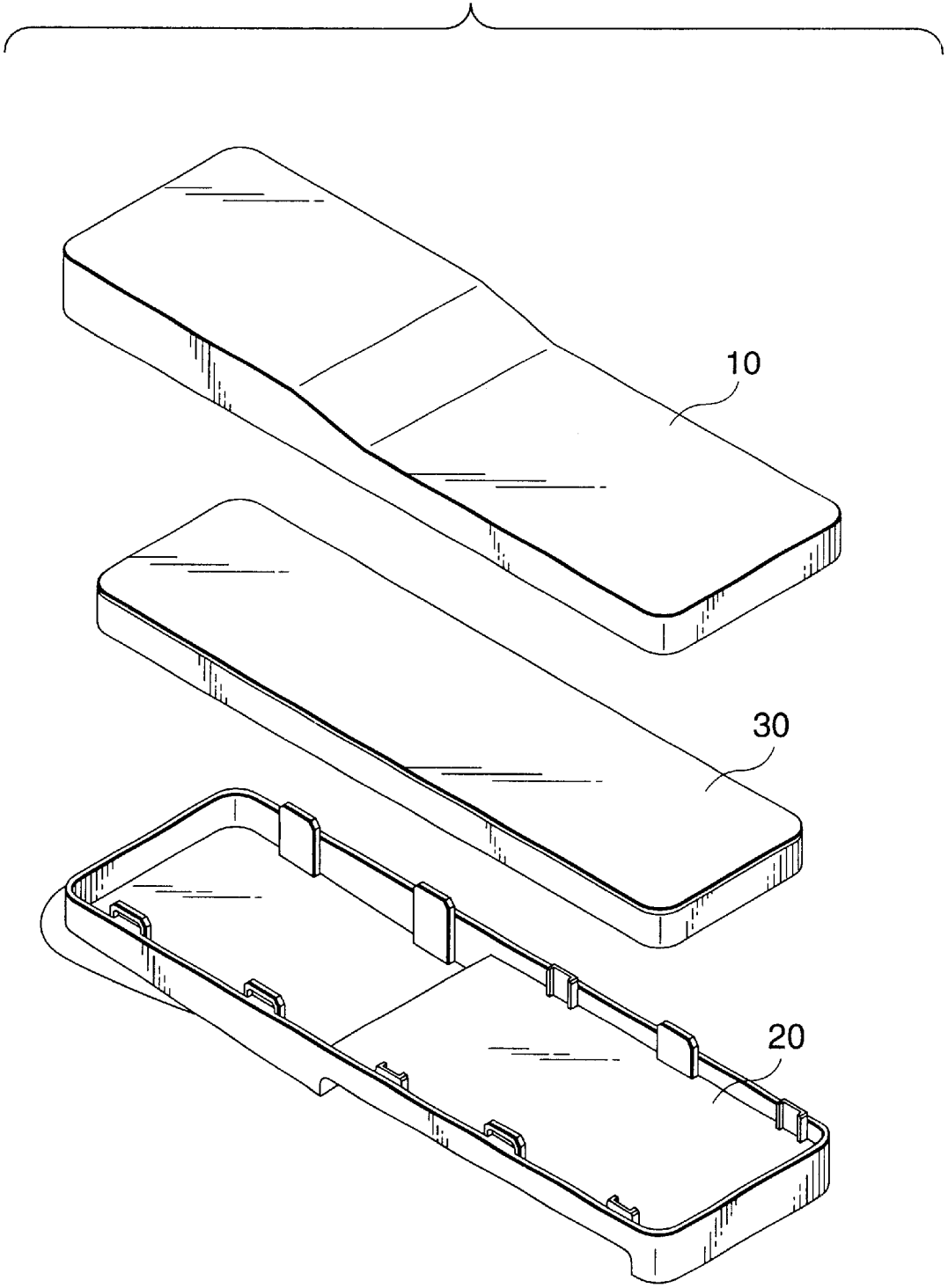
FIG. 1 is an exploded perspective view showing the configuration of a radio device according to an embodiment of the invention.

FIGS. 1 to 10 are diagrams showing the configuration of a radio device and a radio device housing according to an embodiment of the invention. In FIG. 1, the radio device comprises mainly an upper case 10, a lower case 20 and an internal unit 30. Functional blocks and mechanism parts of the radio device main body are not illustrated in order to avoid complication of the drawings. The same is applied to the subsequent drawings.

Figure 2:
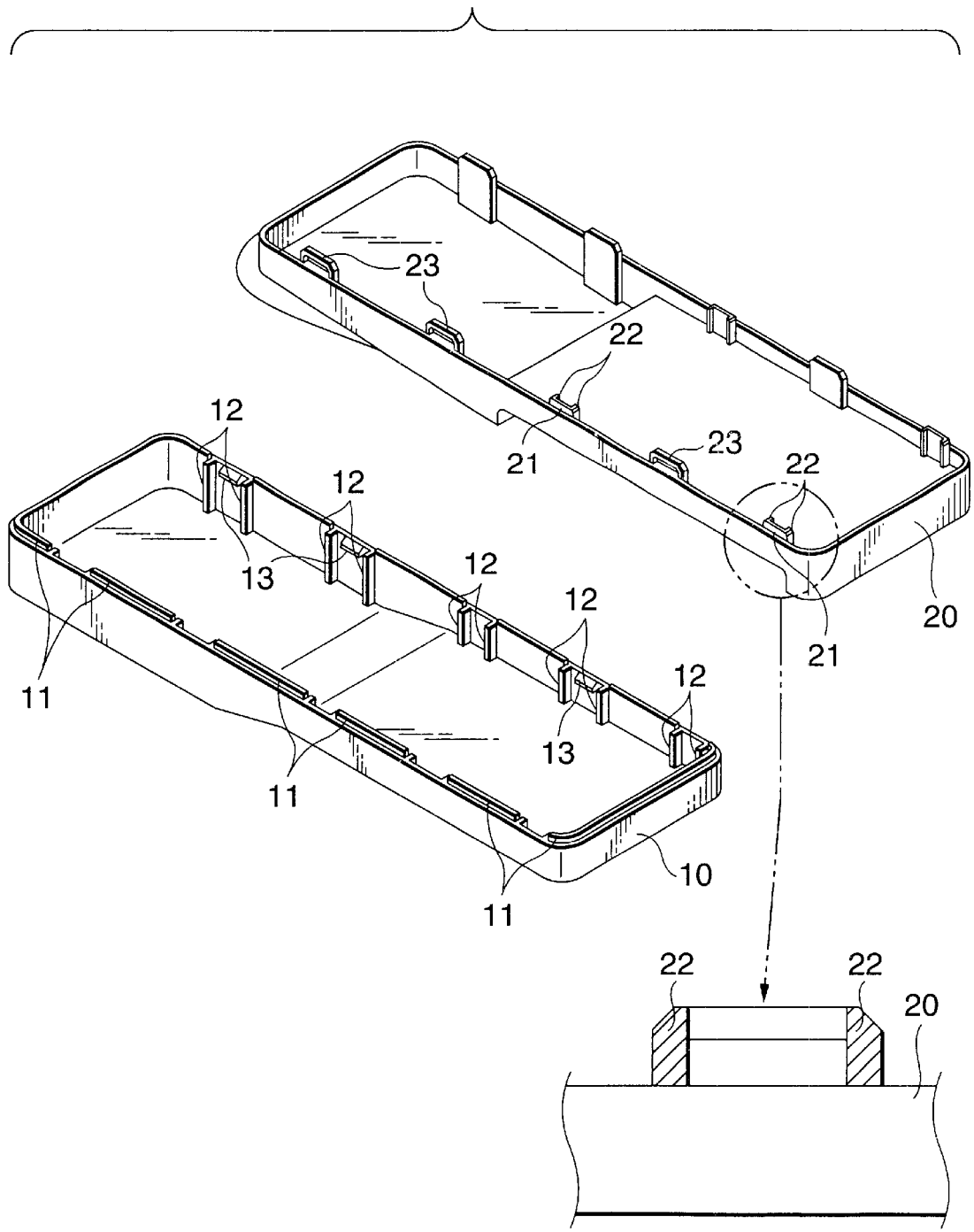
FIG. 2 is a diagram showing the configuration of a radio device housing according to the embodiment of the invention.

In FIG. 2, the upper case 10 is provided with first ribs 11 on the entire periphery along the joint surface with respect to the lower case 20, fitting nails 13 to be fitted with fitting parts 23 of the lower case 20, and third ribs 12 provided on both sides of the fitting nails 13, accurately measured from the center of the fitting nails 13.

On the other hand, the lower case 20 is provided with second ribs 21 in the rifts of the first ribs 11, the fitting parts 23 to be fitted with the fitting nails 13 of the upper case 10, and third ribs 22 provided on both sides of the second ribs 21.

Although the ribs, the fitting nails and the fitting parts are provided in either of the cases in the above-mentioned configuration, it is merely an example so that they can be provided in the opposite side, or partially in the opposite side, and thus it is not limited thereto. Moreover, the third ribs 12, 22 are provided upright in the depth direction of the upper case and the lower case such that the upper case and the lower case can be contacted at least in two points in the entire periphery direction thereof when the upper case and the lower case are fitted with each other.

Figure 3:
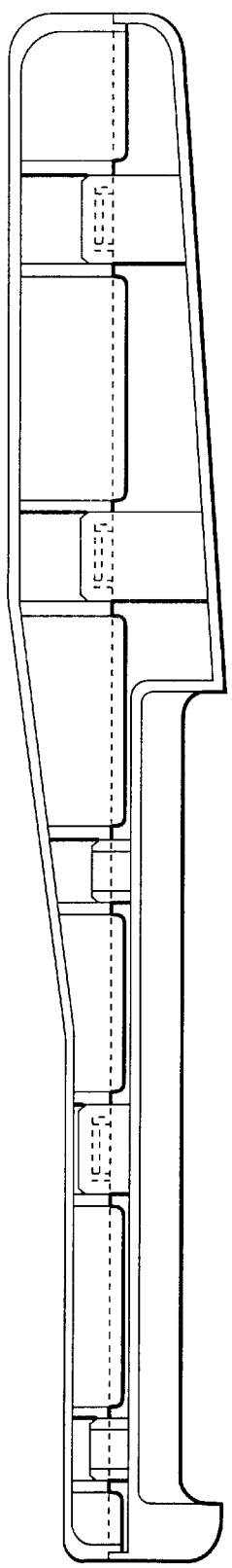
FIG. 3 is a right side view of the radio device housing with a upper case and a lower case fitted with each other according the embodiment of the invention.

FIG. 3 is a right side view of the radio device housing when the upper case 10 and the lower case 20 of FIG. 2 are fitted with each other.

The positional relationship among the third ribs 12, 22, the second ribs 21 and the fitting parts 23 can be understood clearly by referring to FIG. 3.

Figure 4:
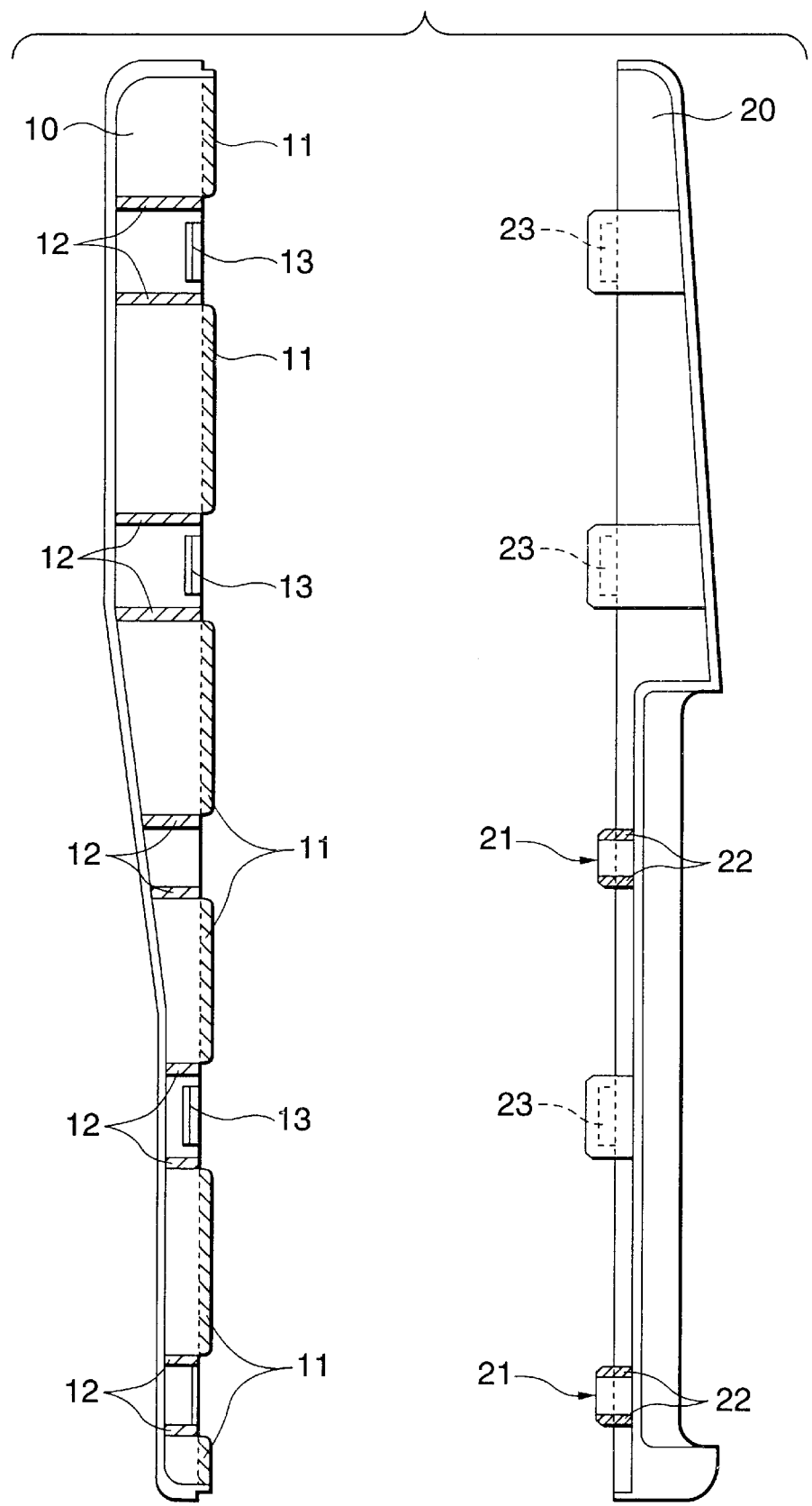
FIG. 4 is a right side view showing the configuration of the upper case and the lower case according to the embodiment of the invention.

FIG. 4 is a right side view showing the configuration of the upper case 10 and the lower case 20. It is observed that unlike the conventional example, the third ribs 12, 22 are provided.

Figure 5:
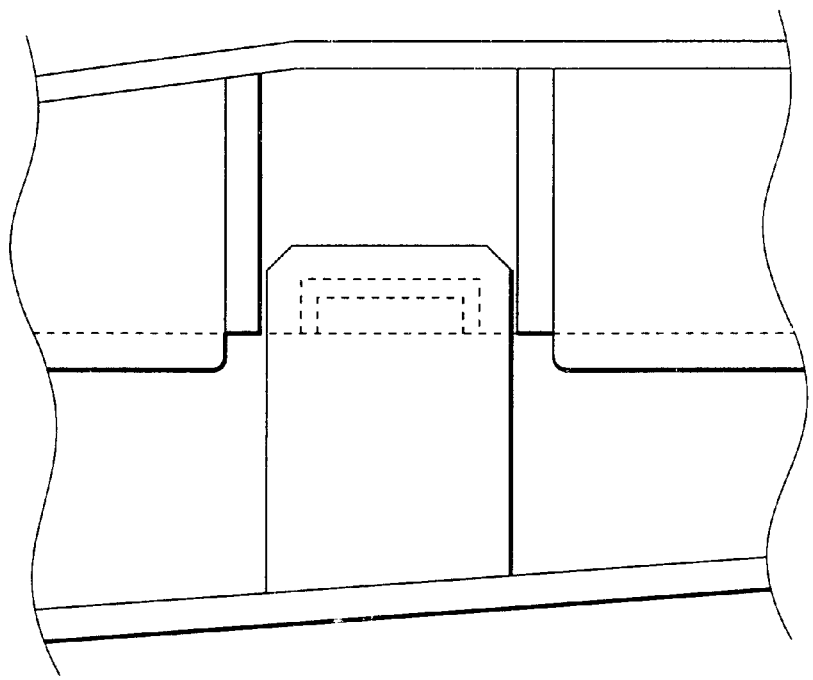
FIG. 5 is a partial enlarged view showing the positional relationship of a third rib at the coupling part of a fitting nail and a fitting part in FIG. 3.

FIG. 5 is a partial enlarged view showing the positional relationship of a third rib at the coupling part of a fitting nail and a fitting part in FIG. 3. The positional relationship between the third rib 12 and the fitting part 23 mentioned above can be understood in further detail by the enlarged view of FIG. 5.

Figure 6:
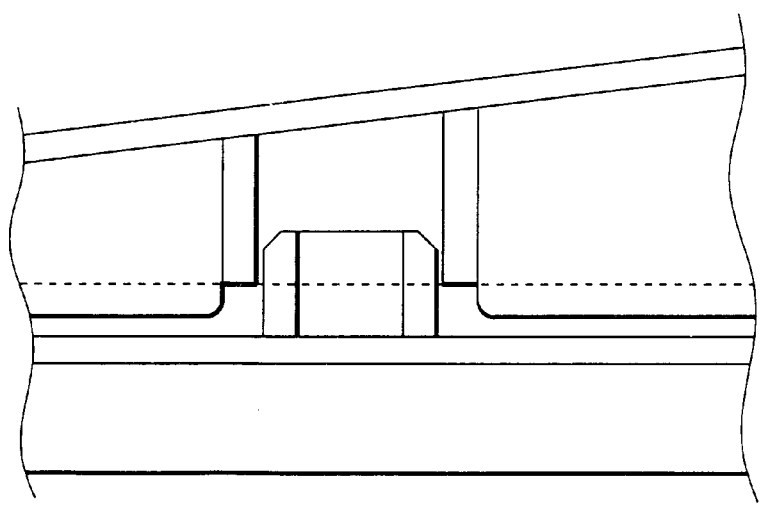
FIG. 6 is a partial enlarged view showing the positional relationship between a second rib and a third rib in FIG. 3.

Moreover, FIG. 6 is a partial enlarged view showing the positional relationship between a second rib and a third rib in FIG. 3. The positional relationship among the third rib 12, the second rib 21 and the third rib 22 mentioned above can be understood in further detail by the enlarged view of FIG. 6. Furthermore, it is observed that inclined surfaces are provided in the vicinity of a tip part of the third rib 22.

Figure 7:
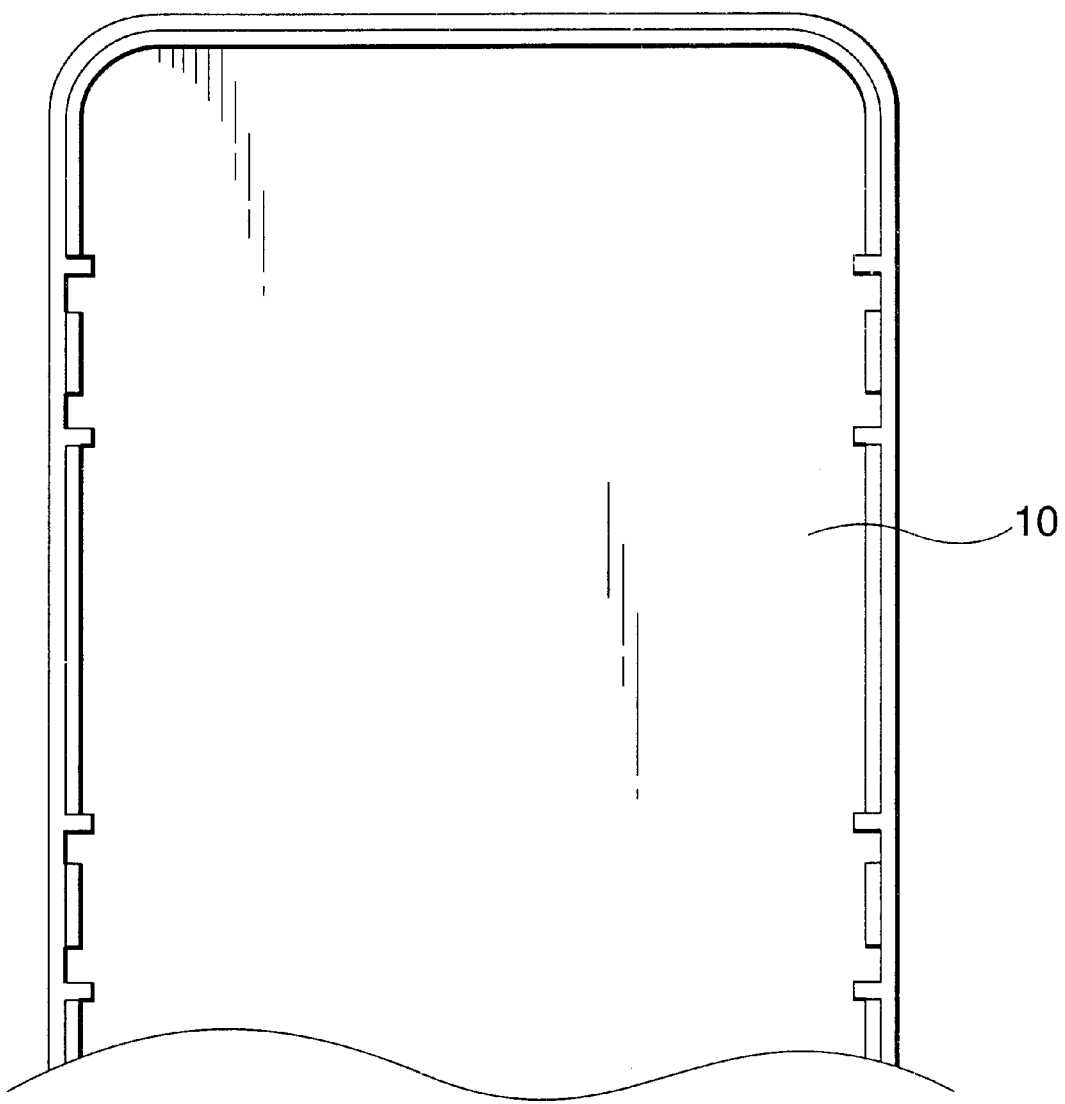
FIG. 7 is a partial plan view of the upper case of FIG. 2.

FIG. 7 is a partial plan view of the upper case 10 of FIG. 2. It is observed in FIG. 7 that the third ribs, the fitting nails and the first ribs are provided in the periphery of the upper case 10. As is apparent from FIG. 7, the first ribs are provided in the entire periphery with rifts from place to place so that the fitting nails and the third ribs are provided in the rifts.

Figure 8:
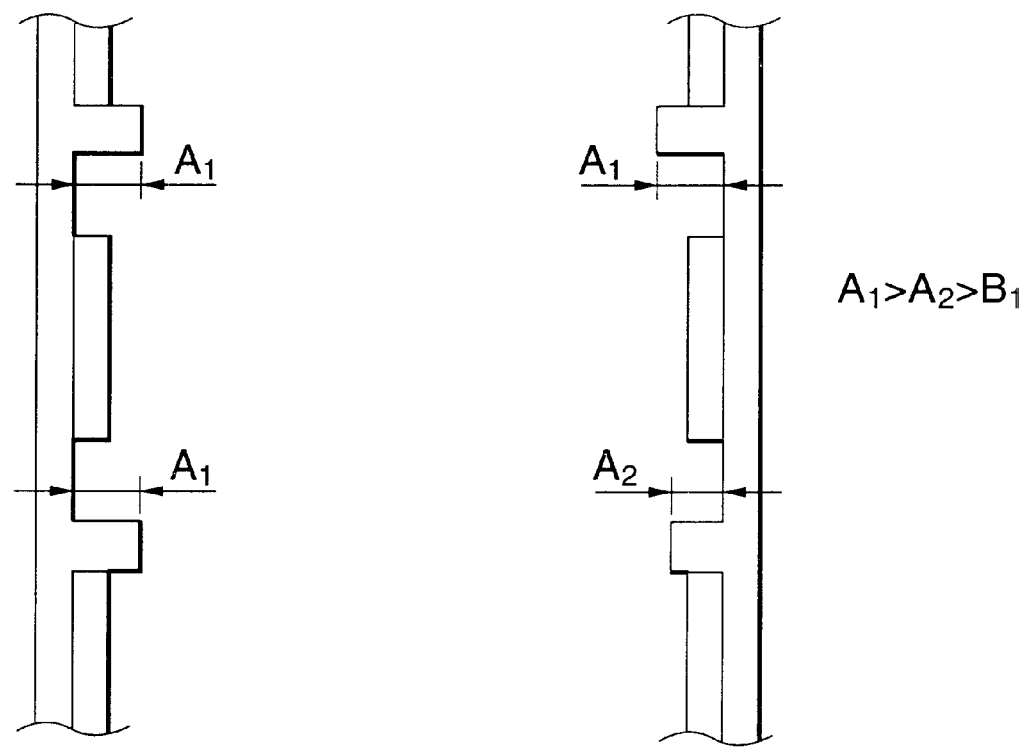
FIG. 8 is an enlarged view of a third rib of FIG. 7.

FIG. 8 is an enlarged view of a third rib of FIG. 7. As is seen in the enlarged view of FIG. 8, the third ribs have different projections sizes A1, A2, depending on the point to be mounted. Moreover, it is observed in FIG. 8 that the projection size of the third ribs A1, A2 is set to be larger than that of the first rib B1.

Figure 9:
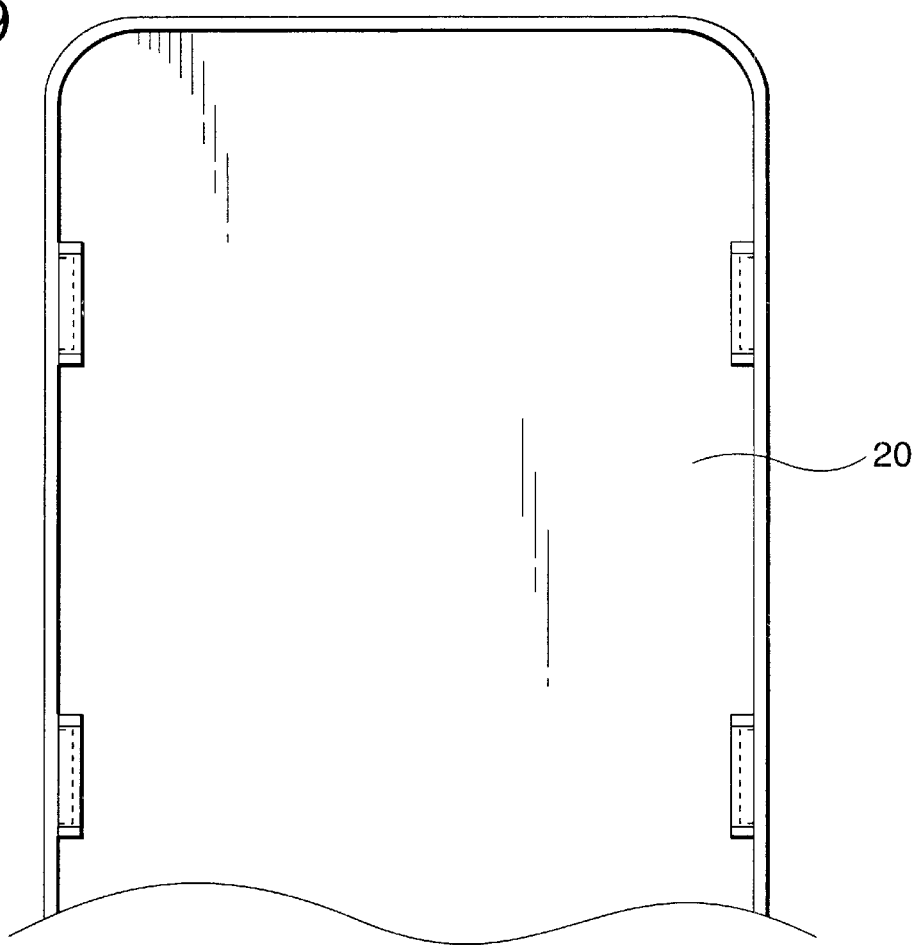
FIG. 9 is a partial plan view of the lower case 20 of FIG. 2.
Figure 10:
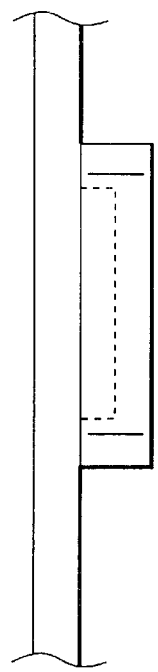
FIG. 10 is an enlarged view of a fitting part in FIG. 9.
Figure 11:
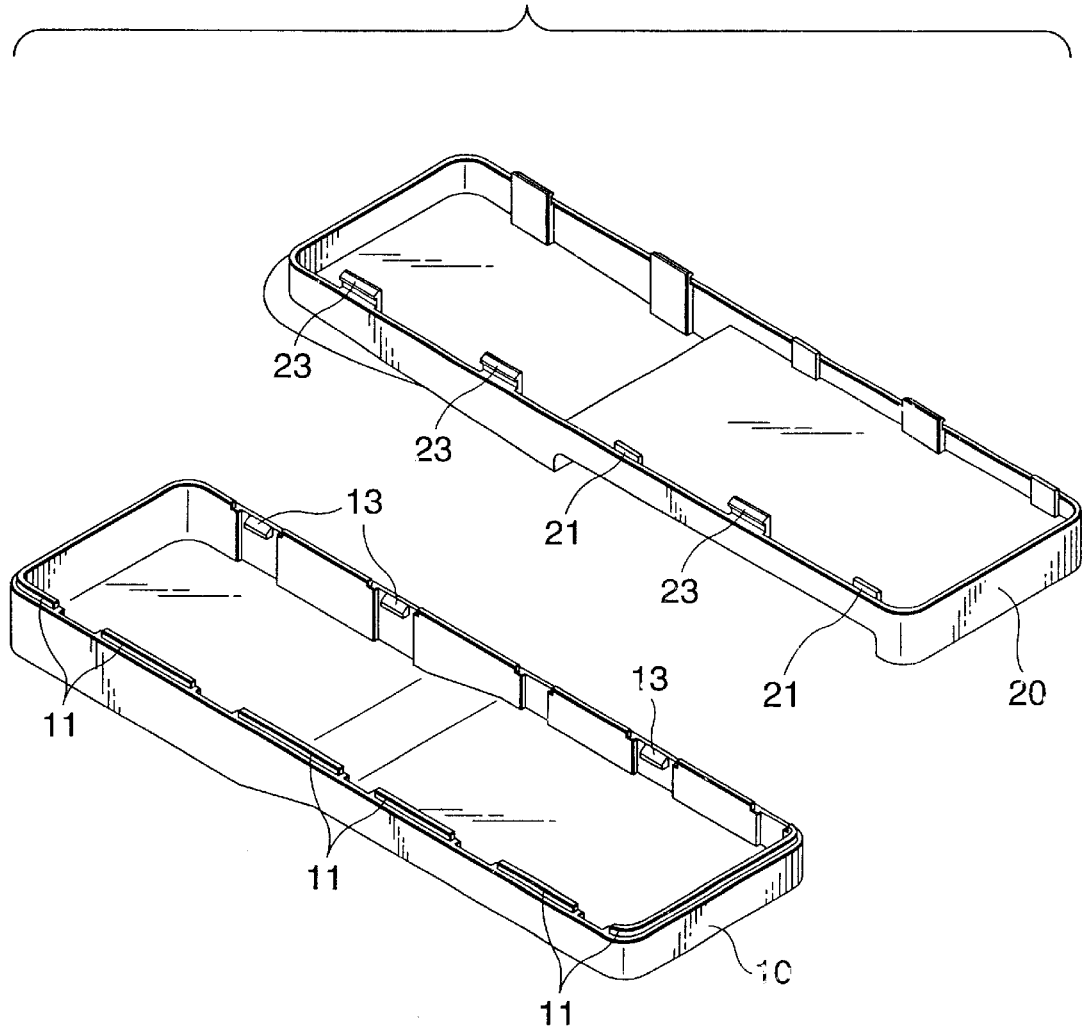
FIG. 11 is a perspective view showing the configuration of a conventional radio device housing.
Figure 12:
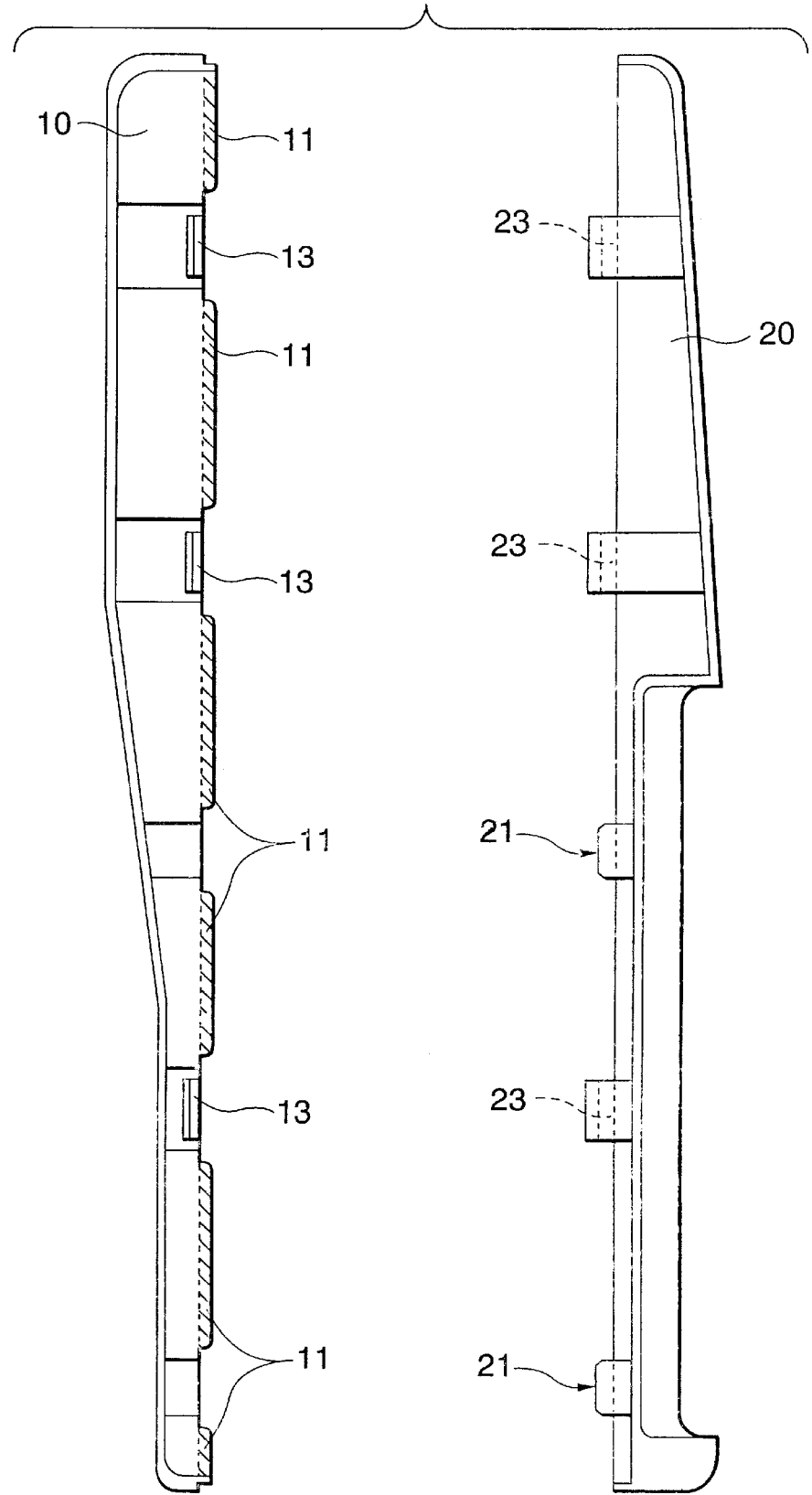
FIG. 12 is a right side view showing the configuration of the conventional radio device housing.
Figure 13:
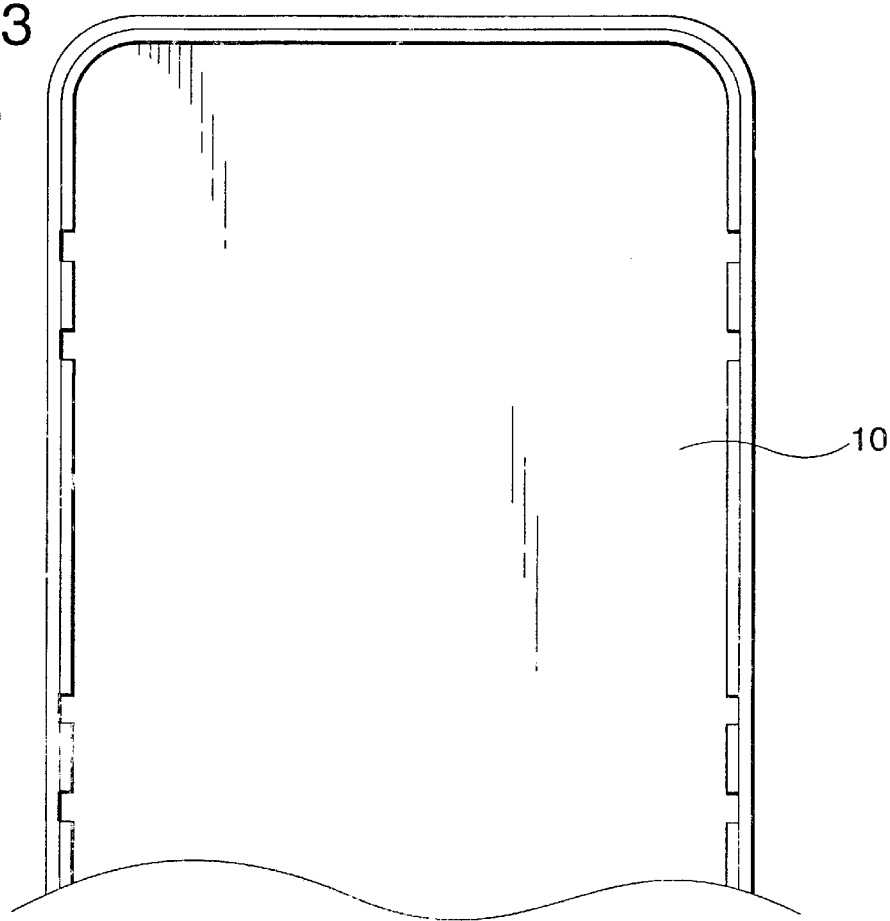
FIG. 13 is a plan view of an upper case according to the configuration of the conventional radio device housing.
Figure 14:
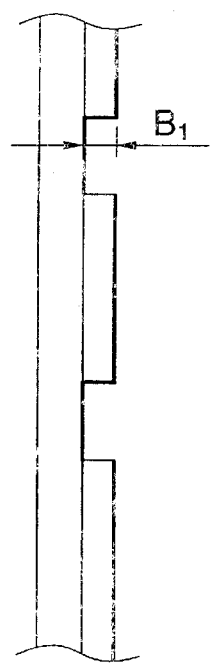
FIG. 14 is a diagram showing the projection size B1 of a first rib in the conventional upper case.
Figure 15:
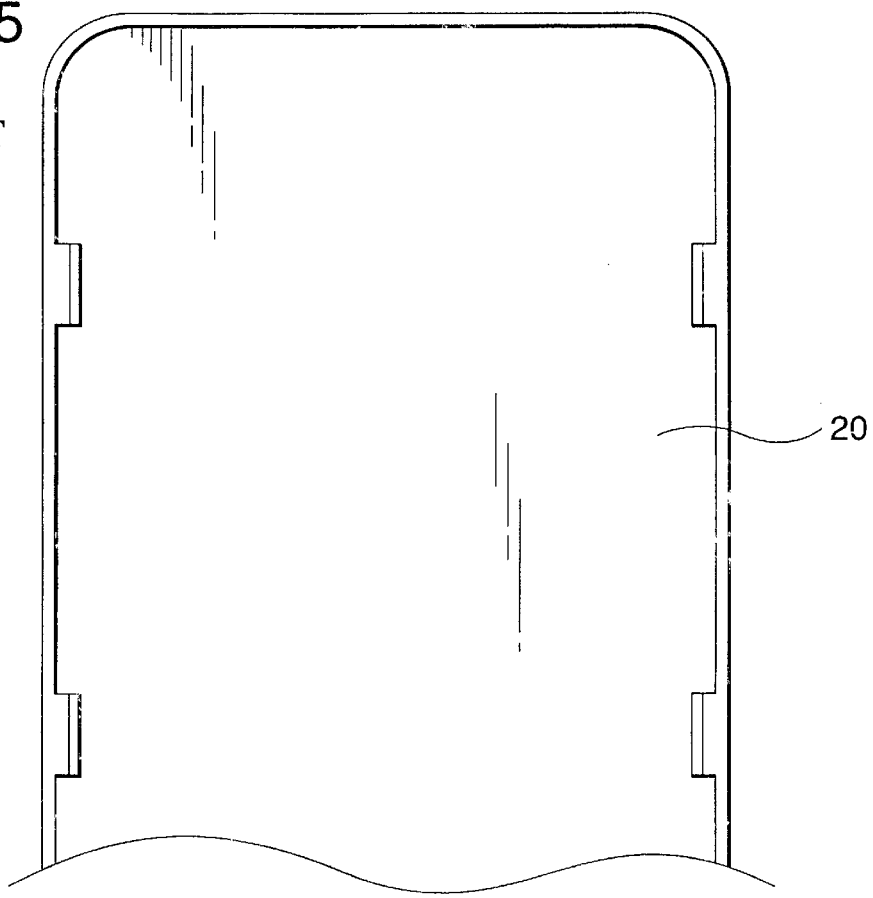
FIG. 15 is a plan view of a lower case according to the configuration of the conventional radio device housing.
Figure 16:
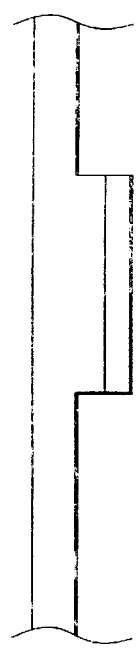
FIG. 16 is a diagram showing the projection size of a fitting part in the conventional lower case.

FIG. 9 is a partial plan view of the lower case 20 of FIG. 2. FIG. 10 is an enlarged view of a fitting part in FIG. 9.

Operation of the radio device housing with the configuration as mentioned above will be explained. After placing a functional block or a mechanism part of the radio device main body on the upper case 10 and the lower case 20, the upper case 10 and the lower case 20 are fitted with each other.

Of course, the fitting operation is executed with positioning at positioning points provided in each part. As a result of fitting the upper and lower cases, the upper case 10 and the lower case 20 will serve as a housing, with the radio device main body accommodated therein.

Then, the first and second ribs function for making up for the mechanical strength in a mode without bend or twist according to the function the same as the above-mentioned conventional configuration. Moreover, according to the function of the third ribs 12, 22, the upper case 10 an the lower case 20 cannot be displaced with each other in the thrust direction when the upper case and the lower case are fitted. As a result, the effect of sufficiently making up for deterioration of the mechanical strength and the rigidity of the main body with respect to bend-or twist deriving from a small size of the radio device main body can be achieved.

As described, since the third ribs are provided on the radio device housing except for the first and the second ribs, the upper case and the lower case are not displaced with each other in the thrust direction when the upper case and the lower case are fitted. As a result, the effect of sufficiently making up for deterioration of the mechanical strength and the rigidity of the main body with respect to bend or twist deriving from a small size of the radio device main body can be achieved.

What is claimed is:

1. A radio device housing comprising:
   an upper case;
   a lower case;
   a plurality of first ribs distributed at a periphery along an interior of a joint surface of one of said upper case and said lower case;
   a plurality of fitting parts provided on the other of said upper case and said lower case, wherein said fitting parts define a receptacle;
   a plurality of second ribs distributed among said plurality of fitting parts;
   a plurality of third ribs provided on said upper case and said lower case; and
   a plurality of fitting nails provided on the one of said upper case and said lower case which includes said first ribs, said fitting nails including a projecting engaging part that fits within said receptacle defined by said fitting parts, wherein each instance of said fitting nails is nested between a pair of said third ribs, and further wherein said first ribs substantially occupy that portion of the periphery not occupied by any of said third ribs and said fitting nails, and still further wherein each instance of said second ribs is connected to an instance of said third ribs on the one of the upper and lower case which includes said first ribs.

2. The radio device housing according to claim 1, wherein an instance of said third ribs on said upper case are in contact with an instance of said third ribs on said lower case at two or more points when said housing is assembled.

3. The radio housing according to claim 1, wherein a surface on said third ribs has an inclination.

4. The radio device housing according to claim 1, further comprising:

said receptacle of said fitting parts comprising ribs, wherein when the case is assembled, said engaging part of said fitting nails engages with said receptacle of said fitting parts such that said ribs of said receptacle are on two sides of said engaging part.

5. The radio device housing according to claim 1, wherein each instance of said fitting nails on said upper case is connectively associated with an instance of said third ribs on said upper case; and further wherein each instance of said third ribs on said lower case is connectively associated with an instance of said second ribs on said lower case.

6. A portable radio device comprising:

a radio device housing comprising:
   an uppercase;
   a lower case;
   a plurality of first ribs distributed at a periphery along an interior of a joint surface of one of said upper case and said lower case;
   a plurality of fitting parts provided on the other of said upper case and said lower case, wherein said fitting parts define a receptacle;
   a plurality of second ribs distributed among said plurality of fitting parts;
   a plurality of third ribs provided on said upper case and said lower case; and
   a plurality of fitting nails provided on the one of said upper case and said lower case which includes said first ribs, said fitting nails including a projecting engaging part that fits within said receptacle defined by said fitting parts, wherein each instance of said fitting nails is nested between a pair of said third ribs, and further wherein said first ribs substantially occupy that portion of the periphery not occupied by any of said third ribs and said fitting nails, and still further wherein each instance of said second ribs is connected to an instance of said third ribs on the one of the upper and lower case which includes said first ribs.

7. A radio device housing comprising:

an upper case having a peripheral edge;

a lower case having a peripheral edge;

a plurality of first ribs distributed at the peripheral edge along a joint surface of one of said upper case and said lower case;

a plurality of fitting parts provided on the other of said upper case and said lower case;

a plurality of second ribs distributed among the plurality of said fitting parts and having a portion protruding beyond said peripheral edge;

a plurality of third ribs provided on said upper case and said lower case; and a plurality of fitting nails provided on one of said upper case and said lower case, wherein each instance of said fitting nails is connectively associated with an instance of said third ribs, and further wherein said first ribs substantially occupy that portion of the periphery not occupied by any of said third ribs and said fitting nails, and still further wherein each instance of said second ribs is connectively associated with an instance of said third ribs.

8. A radio device housing comprising:

an upper case;

a lower case;

a plurality of first ribs distributed across a periphery along a joint surface of one of said upper case and said lower case;

a plurality of fitting parts provided on the other of said upper case and said lower case, said fitting parts including engaging ribs;

a plurality of second ribs distributed among the plurality of said fitting parts;

a plurality of third ribs provided on said upper case and said lower case; and a plurality of fitting nails provided on one of said upper case and said lower case, said fitting nails including an engaging part, wherein each instance of said fitting nails is connectively associated with an instance of said third ribs, and further wherein said first ribs substantially occupy that portion of the periphery not occupied by any of said third ribs and said fitting nails, and still further wherein each instance of said second ribs is connectively associated with an instance of said third ribs, and even further wherein, when the case is assembled, said engaging part of said fitting nails engage with said fitting parts such that said engaging ribs are on two sides of said engaging part.

* * * * *